United States Patent [19]

Thorpe et al.

[11] 4,420,090
[45] Dec. 13, 1983

[54] JUNCTION BOX

[75] Inventors: Frank P. Thorpe, Streetsville; Leslie O. Calhoun, Richmond Hill, both of Canada

[73] Assignee: CTS Corporation, Elkhart, Ind.

[21] Appl. No.: 152,379

[22] Filed: May 22, 1980

[30] Foreign Application Priority Data

May 16, 1980 [CA] Canada ................................ 352079

[51] Int. Cl.³ .................................................. H02G 3/12
[52] U.S. Cl. ........................................ 220/3.7; 220/3.8
[58] Field of Search .............................. 220/3.4–3.94; 52/220, 221

[56] References Cited

U.S. PATENT DOCUMENTS

| | | | |
|---|---|---|---|
| 2,929,529 | 3/1960 | Hudson | 220/3.7 X |
| 3,070,252 | 12/1962 | Reiland | 220/3.7 |
| 3,187,922 | 6/1965 | Hoskins et al. | 220/3.4 |
| 3,199,713 | 8/1965 | Flachbarth | 220/3.7 |
| 3,204,378 | 9/1965 | Stuessel | 220/3.7 X |
| 3,435,568 | 4/1969 | Hoseason et al. | 220/3.4 X |
| 3,453,791 | 7/1969 | Fork | 220/3.4 X |
| 3,593,472 | 7/1971 | Bargar et al. | 220/3.4 X |
| 3,733,761 | 5/1973 | Casto | 220/3.4 X |

FOREIGN PATENT DOCUMENTS 932277  8/1973  Canada ................................ 189/2.2

*Primary Examiner*—William Price
*Assistant Examiner*—Gary E. Elkins
*Attorney, Agent, or Firm*—Larry J. Palguta; John A. Young

[57] ABSTRACT

A junction box in which the frame includes a header fitted within the frame, and includes a groove closely following the inner perimeter of the box opening, and a central recess receiving a lid. A floor covering which may be either carpet or vinyl is then cut, following the outline of the groove, and the perimeter of the cut is then covered with a portion of a trim force fitted within the groove. The lid is held down and the corners of the floor covering are pulled tightly against the lid with the covering as a whole held firmly around the entire periphery of the submerged junction box.

7 Claims, 8 Drawing Figures

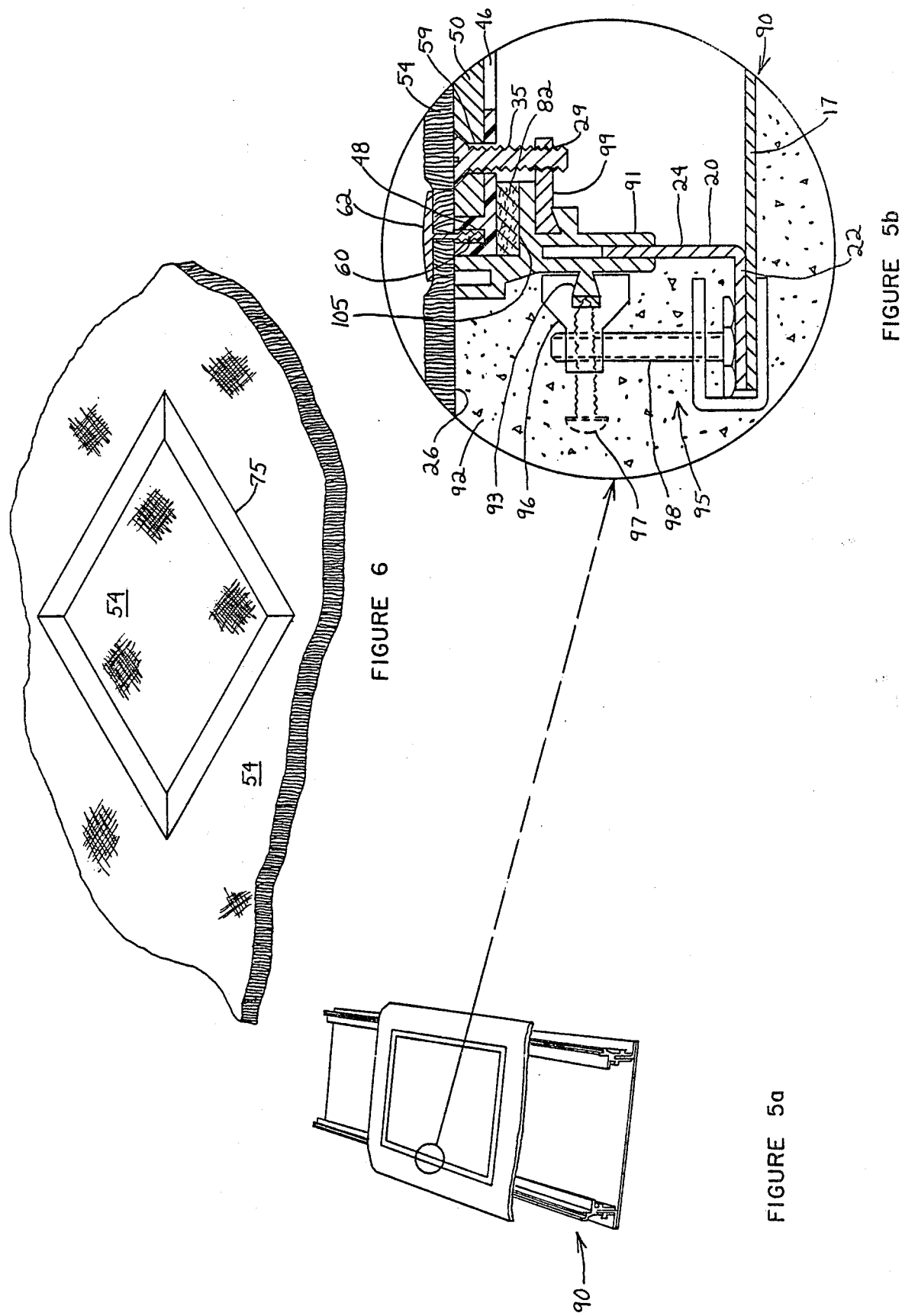

JUNCTION BOX

BACKGROUND OF THE INVENTION

Junction boxes of square design are inherently advantageous because it is possible to effect a wrinkle-free edging in the vicinity surrounding a submerged junction box.

An important advantage to constructing a square junction box and a square trim surmounting the junction box, is that a square hole can be constructed with far greater accuracy and the cover member can then be held down reliably at the corners by a hold-down device. Additionally, where square lids are provided they are readily replaceable and matchable in color and style with the existing tile or carpet that covers the surface.

SUMMARY OF THE INVENTION

It is an object of the present invention to provide an improved junction box design in which the submerged portion of the box includes a frame consisting of a recessed central portion adapted to receive a lid, and a surrounding groove adapted to receive an aluminum or plastic trim therein.

Another object of the present invention is to construct a novel junction box design which is square in configuration and in which the lid is readily adjustable in height and planar location, but without removal of the lid, and while the lid is held in operative position.

Another object of the present invention is to provide a novel trim which can be readily inserted within grooves of a frame member and forms a reliable and tenacious gripping connection therewith.

Another important object of the present invention is to provide a novel junction box construction in which the lid is readily externally adjustable so that it will match the plane of the floor and readily coincide with the floor level and grade, thus obviating surface irregularities.

Another important feature of the present invention is the use of a junction box incorporating a T-shaped aluminum trim which surrounds the cut in the carpet or vinyl and which conceals the cut line by forming a press-insert connection with a holder at the upper surface of the junction box.

Other objects and features of the present invention will become apparent from a consideration of the following description which proceeds with reference to the accompanying drawings.

DRAWINGS

FIG. 5a is an isometric view of a trench duct using the trim constructed in accordance with the present invention;

FIG. 5b is an enlarged detailed section view of the portion encircled in FIG. 5a;

FIG. 6 is an isometric view of the installed junction box;

DETAILED DESCRIPTION OF THE INVENTION

The present invention is intended for application with an underfloor raceway system (FIG. 7) which is a typical method of distributing electrical and communication services.

Figure 1:
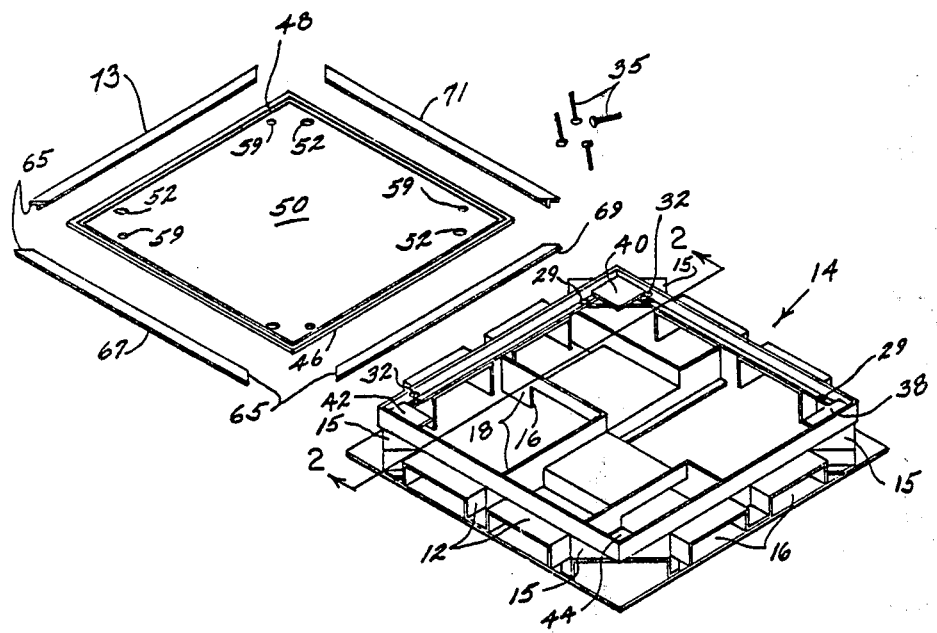
FIG. 1 is an isometric view of a junction box constructed in accordance with the present invention.
Figure 2:
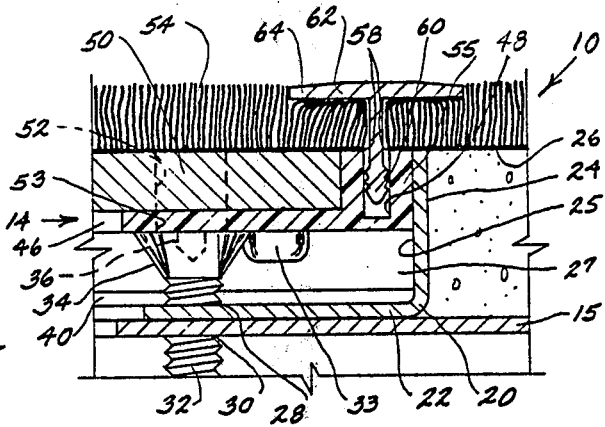
FIG. 2 is a partial section detail view taken along lines 2—2 of FIG. 1 after the junction box is assembled.
Figure 3:
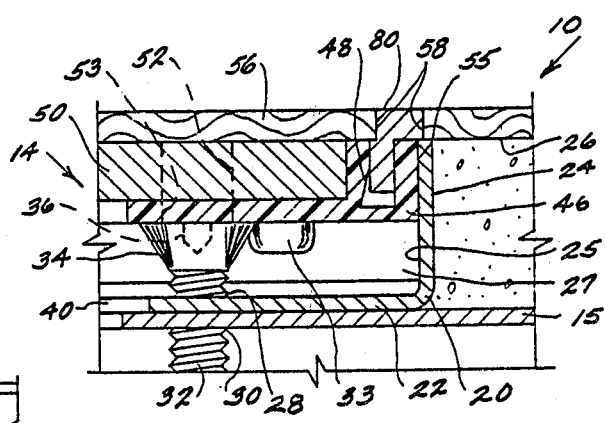
FIG. 3 illustrates in section view a second embodiment in which the floor covering is vinyl, and having a different trim member.

Referring to FIGS. 1–3, there is designated generally a floor 10 with a sub-section of the floor including ducts 12 which intersect junction boxes 14, at receptor openings 16 shown in particular in FIG. 1.

Junction box 14 includes typically, a number of receptor openings 16 to receive the ducts and various partitions 18 which separate the internal portion of the junction box into open and closed areas. Surrounding the junction box is a concrete ring 20 having a base flange 22 and an upright flange 24 constructed approximately at right angles to each other, with the flange 24 extending approximately to the level of the concrete line 26 and the interior wall 25 of flange 24 defining the junction box opening 27 (FIG. 2).

Figure 4:
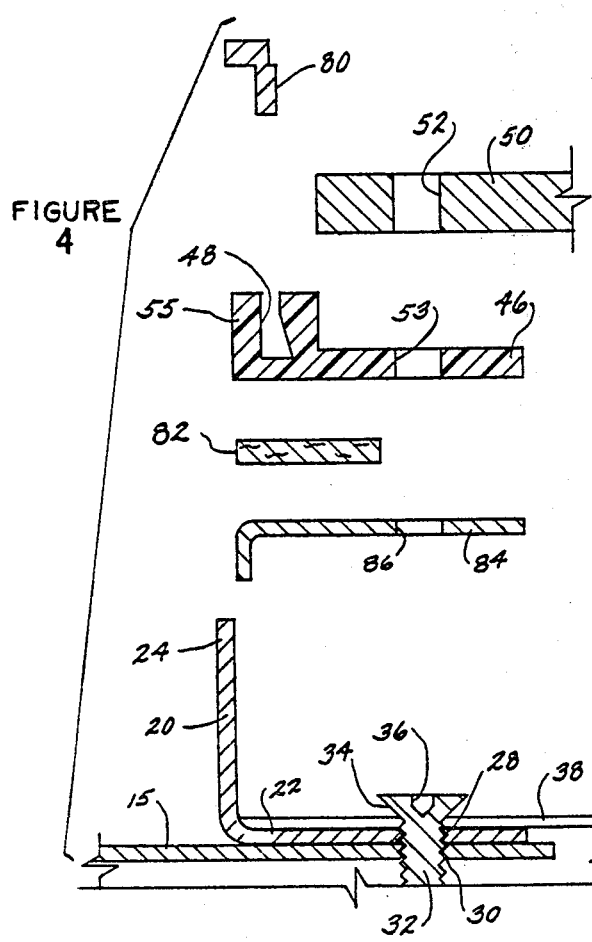
FIG. 4 is an enlarged exploded fragmentary view of the invention.

Base flange 22 of concrete ring 20 has threaded openings 28 (FIGS. 3 and 4) which register with threaded openings 30 in the top surfaces 15. A threaded adjusting screw 32 having a conical head 34 and slot or other configuration 36 for turning the screw 32, is received in each set of threaded opening 28, 30. There is a screw 32 and openings 28, 30 adjacent each of the respective junction box corner supports 38, 40, 42, and 44. Resting on the head of the screw is a vinyl header 46 which extends around the entire inner periphery of the concrete ring 20 and includes a groove 48. Header 46 receives therein a lid 50 with openings 52 (FIGS. 1–3) in the lid and openings 53 in the header 46 registering with the central configurated portions 36 of the adjusting screws 32. The screws 32 can be turned by a tool which is inserted through the openings 52 and 53 of the cover 50 and header 46, respectively, by whatever amount is necessary to adjust the height and planar disposition of the lid 50. The lid 50 is proportioned to substantially cover the entirety of the junction box except at the outermost peripheral edges adjacent to which are located the grooved sections 55 of the vinyl header 46. A screw 33 located under each corner of the header 46 serves to fasten together the header 46 and lid 50 so that both can be removed simultaneously when the junction box 14 is being opened for service. The lid 50 has openings 59 for receiving hold down screws 35 receivable in threaded openings 29 for securing the lid to the junction box 14. The hold down screws 35 also pass through aligned openings (not shown) in the header 46.

When it is intended to complete installation of the junction box, a carpet 54 (FIG. 2) or vinyl covering 56 (FIG. 3) is cut to form edges 58, the cut being in conformity with the outline of the groove 48 of the header 46, and there is press fitted into the groove 48 a shank 60 of a T-shaped extruded aluminum or plastic trim 62. The flanges 64, which are integrally related to the shank 60, are thereby drawn downwardly and clamped against the carpet 54 in order to firmly cover the edges 58 and provide a trim completely surrounding the junction box opening 27. As shown in FIG. 1, the corner edges 65 of the trim pieces 67, 69, 71 and 73 are cut at a mitre so that they will form a complete square frame 75 (See FIG. 6) which provides a wrinkle-free edging for a completely closed junction box opening. Because the corners of the lid 50 are held down firmly by the hold down screws 35, the trim pieces can be pried up when necessary to remove the carpet 54 and then the lid 50, thereby providing access to the interior of the junction box 14. The hold down screws may also be exposed through the floor covering to allow the cover to be removed complete with the floor covering and trim attached as originally installed.

OPERATION

Figure 7:
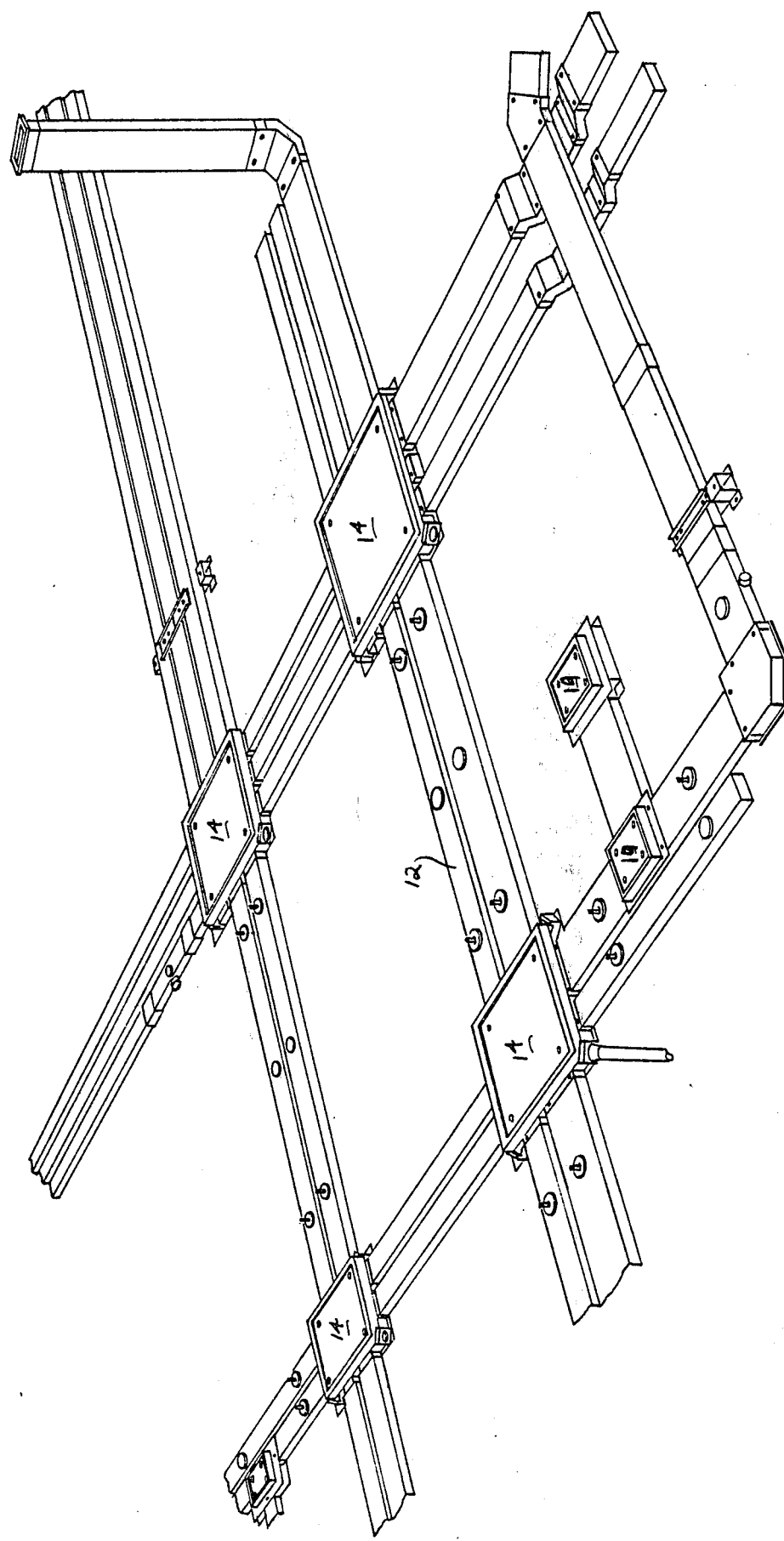
FIG. 7 illustrates schematically a complete duct system in which the present invention can be adapted.

As illustrated in FIGS. 6 and 7, once the junction box 14 is located in position, distribution of electrical services is effected either by passage of telephone line or other service connections through the duct lines 12. The floor covering in the form of carpet or linoleum is cut in a square outline to match the outline of the removable cover of the junction box 14.

The vinyl header 46 (FIG. 1) and lid 50 are inserted into the junction box opening 27, and the screws 32, one at each of the corners of the junction box, are then adjusted to raise, lower, and individually adjust each of the four corners so that the lid 50 is located at the correct surface level as to match with the plane of the floor. Hold down screws 35 (FIG. 5) may be engaged in order that the lid is secured to the junction box.

The carpet or vinyl is then laid and a cut out square of carpet superposed onto the upper surface of the lid 50, and the T-shaped extruded aluminum or plastic trim pieces 67, 69, 71, and 73 inserted so that shanks 60 pass the into the groove 48 and hold down the edges 58 of the carpet square. More specifically, the shanks 60 are force fitted within the groove 48 and the overlying flanges 64 of the trim pieces completely seal the edges 58 and provide a firm hold down for the squares.

Since the intersecting corner edges 65 of the trim pieces are mitred, the resulting configuration is a square design framed by the aluminum trim, as shown in FIG. 6.

As described, there is no need for a gasket under the lid because the header 46 is a vinyl extrusion and it also serves as a noise barrier. The aluminum trim completely frames and covers the edges of the carpet preventing any scuffing or curling.

The junction box 14 can be opened for service as necessary by prying the trim pieces 67, 69, 71, and 73 out, removing the overlying carpet square and hold down screws 35, and then removing the lid 50 and header 46 thereby gaining access to the interior of the junction box. Other junction box assemblies such as hand hole access assemblies 19 (FIG. 7) also can be modified to accept the vinyl holder and trim construction.

FURTHER EMBODIMENTS

Referring to a further embodiment of the junction box 14 shown in FIG. 3, instead of being of T-shaped cross section, the aluminum trim pieces can be of stepped cross section 80. There may be further included a gasket 82 (FIG. 4) and an adjusting plate 84 between the adjusting screws 32 and the vinyl header 46. In this further embodiment, the adjustment of the level of the plate 84, the header 46, and lid 50 is the same as in the previously described embodiment and for that reason will not be repeated. It should be noted that the adjusting plate 84 (FIG. 4) has an aperture 86 registering with openings 52 and 53 to permit external adjustments of screws 32 as before described and for the purpose beforedescribed. The gasket 82 and adjusting plate 84 may be used with either of the embodiments shown in FIGS. 2 and 3. The installation of the box follows generally the same steps described above for the T-shaped trim pieces.

Referring to a further embodiment of the junction box as shown in FIGS. 5a and 5b, instead of a square junction box there is shown a trench duct which is adapted to receive the aluminum trim and extrusion holder of the present invention. Trench duct 90 has mounted upon the concrete ring 20 a frame 91 which serves to form an upper perimeter within the trench duct by abutting the poured concrete 92, and serves as a support for the extrusion header 46, T-shaped extruder aluminum or plastic trim 62, lid 50, gasket 82, carpet 54 (or vinyl covering 56), and other components to be described. The frame 91 consists of a longitudinal metallic support having two depending legs fitable over the flange 24 of concrete ring 20. The frame 91 is supported on the flange 24 by vertical support designated generally by numeral 95 which is mounted upon the combination of the base flange 22 and base 17. The vertical support 95 has a bracket support 96 which receives frame flange 93 and which is vertically adjustable. A screw 97 passes through the bracket support 96 and fixes the flange 93 after vertical adjustment of the bracket support 96. The support bracket 96 is adjusted so that the top portion of frame 91 will be level or flush with the concrete line 26, and once adjusted the bracket support 96, screw 97, and support post 98 are covered by the poured concrete 92. The removable components of the trench duct 90 are assembled in essentially the same manner as previously described, however, this embodiment may or may not have a lid 50 and vinyl header 46 that are adjustable such that various planar positions may be effected. The frame 91 has attached thereto a horizontal flange 99 having a plurality of threaded openings 29 each receiving a hold down screw 35. A gasket 82 is disposed along the upper surface 105 of frame support 91, and then the combination of the vinyl header 46 and lid 50 is positioned upon the gasket 82. Hold down screws 35 may be inserted through openings 59 and threaded into the openings 29 in horizontal flange 99 thereby securing the lid to the frame 91.

As described above, the carpet 54 is then cut and positioned upon the lid and the surrounding floor surface, and the T-shaped extruded aluminum or plastic trim 62 is positioned by inserting the shank 60 into the groove 48 of the vinyl header 46, thereby holding down the edges of the carpet or vinyl floor covering. The trench duct may then be opened for servicing by removing the trim 62, pulling up the cut carpet 54 or vinyl 56, and removing hold down screws 35, thereby enabling removal of the lid and providing access to the underlying electrical and telecommunication lines.

CONCLUSION

A junction box, square in outline, is covered with an adjustable cover which can be raised, lowered, and leveled by individual adjustments at each of its four corners. The cover is thus disposed at the correct height, plane, and position. Once adjusted and secured, the junction box cover is overlaid with floor covering such as a carpet or tile. The cut edges of the floor covering are pulled down with trim members of aluminum or other desireable trim. The trim pieces are press fitted within the groove of a vinyl holder within the junction box. The groove provided by the holder is adjustably positioned at subfloor level. The trim pieces are installed to provide a wrinkle-free edging for the floor covering and the lid is held securely at each of its four corners. The floor covering and lid can be easily replaced as the need arises or to provide access to the junction box. The final box trim is an attractive finish which clearly locates the junction box, but is securely fastened so that it will not be kicked up, and also will prevent curling of the floor covering edges. The trim and holder constructions may be used to provide for access openings in other electrical or telecommunication system carriers such as a trench duct.

The present invention has been illustrated and described in connection with certain selected example embodiments. It will be understood that these are illustrative of the invention and are by no means restrictive thereof. It is reasonably to be expected that those skilled in this art can make numerous revisions and additions of the invention and it is intended that such revisions and additions will be included within the scope of the following claims as equivalent of the invention.

What is claimed as new and desired to be secured by Letters Patent of the United States is:

1. A junction box for encasement in concrete and comprising a substantially square box, an outer frame assembly consisting of a base portion and an inner frame assembly, said inner frame assembly being supported on said base portion, means forming a part of said outer frame assembly for abutting against a concrete surface, a plurality of weight carrying adjusting screws received through said base portion of said outer frame assembly to effect selective adjustment of said inner frame assembly relative to said abutting means and the concrete surface, a cover plate forming a part of said inner frame assembly, a header forming part of said inner frame assembly and circumscribed by said outer frame assembly and supported by said weight carrying adjusting screws, said header having a groove about the periphery thereof, and a trim comprising a central shank adapted to be force fitted within the groove of said header, and lateral means also forming a part of said trim and extending around the perimeters of said cover plate and outer frame assembly.

2. The junction box in accordance with claim 1, wherein said header is of a grooved polyvinyl plastic composition.

3. The junction box in accordance with claim 1, wherein said trim is constructed of an aluminum extrusion.

4. The junction box in accordance with claim 1, wherein said trim is constructed of a plastic extrusion.

5. The junction box in accordance with claim 1, including a carpet section overlying said cover plate and held down by said trim.

6. The junction box in accordance with claim 1, wherein the cover plate and header have a plurality of aligned access openings providing for external adjustment of said screws thereby allowing adjustment of the planar positions of said cover plate and header.

7. The junction box in accordance with claim 1, further comprising a gasket and an adjustable inner plate both disposed beneath and supporting said inner frame assembly, the inner plate having a plurality of openings, each aligned with a respective adjusting screw.

* * * * *